United States Patent [19]

Okumura et al.

[11] 4,246,040

[45] Jan. 20, 1981

[54] SURFACE TREATMENT METHOD

[75] Inventors: Jugoro Okumura, Tokyo; Satoshi Noma, Yokohama, both of Japan

[73] Assignees: Nihonshikizai Kogyo Co., Ltd., Tokyo; Takeda Chemical Industries, Ltd., Osaka, both of Japan

[21] Appl. No.: 40,211

[22] Filed: May 18, 1979

[30] Foreign Application Priority Data

Jun. 5, 1978 [JP] Japan ................................. 53-68174

[51] Int. Cl.$^3$ .............................................. C09C 3/00
[52] U.S. Cl. ............................ 106/308 B; 106/308 Q; 106/308 C; 106/308 F
[58] Field of Search ............ 106/308 C, 308 S, 308 F, 106/308 B, 308 Q

[56] References Cited

U.S. PATENT DOCUMENTS

| | | | |
|---|---|---|---|
| 3,146,119 | 8/1964 | Ritter | 106/308 B |
| 3,642,510 | 2/1972 | Sugiyama et al. | 106/308 Q |
| 3,656,982 | 4/1972 | Chapman et al. | 106/308 S |
| 3,946,134 | 3/1976 | Sherman | 106/308 B |

FOREIGN PATENT DOCUMENTS 36-19379 10/1961 Japan ..................................... 106/308 F

*Primary Examiner*—James Poer
*Attorney, Agent, or Firm*—Wenderoth, Lind & Ponack

[57] ABSTRACT

An excellent hydrophilic or lipophilic property is given to a powdery or granular solid substance by reacting a basic polyaluminium salt with an acid or its salt in the presence of the powdery or granular solid substance.

23 Claims, No Drawings

SURFACE TREATMENT METHOD

This invention relates to a surface treatment method. More concretely, the present invention relates to a surface treatment method of a powdery or granular solid substance, which comprises reacting a basic polyaluminium salt with an acid or its salt in the presence of a powdery or granular solid substance.

There are known a large number of methods of treating surfaces of solids, but very few have been free from imperfections to be improved in terms of the application scope, treatment effect, economics, and the like.

The inventors have made diligent study to develop a new surface treatment method which can be widely applied to a variety of materials in powder-form or granule-form, and, at the same time, which is capable of easily imparting different surface characteristics, e.g. the hydrophilic and lipophilic properties, improvement of colouring property, and the like, depending on the intended purposes. In particular, pigments, with their strong cohesion, give rise to trouble in the resulting hue and dispersion, when being used as colorants. Although nearly all pigments have been surface-treated so as to solve these problems, the known surface treatment methods so far employed have limited scope of application in materials to be treated, poor workability, and other drawbacks.

The present inventors have found that the problems inherent to the conventional arts of skill can be solved by the present invention.

The basic polyaluminium salts, which are utilized in the present invention, are polymers whose composition formula is:

$$Al_{2+n}(OH)_{3n}X_m$$

(wherein m and n are positive integers, provided that m is a number produced by dividing 6 by the valence of X; X is anion e.g. $CL^-$, $Br^-$, $I^-$, $NO_3^-$, $ClO_4^-$ or $SO_4^-$) Normally employed are those with n of not less than 1, preferably with n of not less than 4, and more preferably with n of 4 to 14. More specifically, there may be mentioned compounds e.g. $Al_6(OH)_{12}Cl_6$ and $Al_{12}(OH)_{30}Cl_6$.

The above described composition formula is merely representative of the unit composition and, basic polyaluminium salts occur, actually, as a polymeric substance resulting from a number of the structures of the above described unit composition formula combined to a long chain form. And, the salts with about 300 to 50,000 (more preferably about 500 to 10,000) in molecular weight may be especially advantageous.

The basic polyaluminium salts can easily be prepared in accordance with known methods described for example in Japanese Patent Publication Nos. 19379/61, 4149/60, 3909/63, etc. or analogoues methods thereto.

The acidic substances (i.e. above-mentioned acids) to be employed in the present invention, there may be organic acids or inorganic acids. As the organic acids may be mentioned branched or straight-chain carboxylic acids, straight-chain sulfonic acids, monocyclic or polycyclic carboxylic acids, monocyclic or polycyclic sulfonic acids and any other compounds which are soluble in water or organic solvents, and react with basic polyaluminium salt to produce the reaction product, i.e. polymeric hydroxy-aluminium acid salt according to the following reaction schema, the polymeric hydroxy-aluminium acid salt being naturally a polymer of the composition formula: $Al_{2+n}(OH)_{3n}Rm$.

$$Al_{2+n}(OH)_{3n}X_m + m.(Y-H \text{ or its salt}) \rightarrow Al_{2+n}(OH)_{3n}Rm$$

wherein Y—H is an acid and each of n, m and X has the same meaning as defined above.

The above-mentioned branched or straight-chain carboxylic acids or sulfonic acids are exemplified by caproic acid, caprylic acid, capric acid, lauric acid, myristic acid, palmitic acid, stearic acid, behenic acid, ricinoleic acid, isostearic acid, fumaric acid, maleic acid, sebacic acid, adipic acid, lauryl sulfuric acid, and other aliphatic carboxylic acids (preferably having a carbon atom number of 6 to 22) or sulfonic acids (preferably having a carbon atom number of 6 to 22). As the monocyclic or polycyclic carboxylic acids or monocyclic or polycyclic sulfonic acids are mentioned cinnamic acid, o-benzoylbenzoic acid, cumic acid, diphenylacetic acid, p-ethoxybenzoic acid, naphthalic acid, naphthenic acid, α-naphthoic acid, alkylnaphthalene carboxylic acid (e.g. n-nonylnaphthoic acid, n-octylnaphthoic acid, etc.), naphthoxyacetic acid, 1-naphthylacetic acid, p-t-butylbenzoic acid, p-n-hexylbenzoic acid, p-n-octylbenzoic acid, p-n-nonylphenoxyacetic acid, p-n-nonylbenzoic acid, glycyrrhetic acid, glycyrrhizic acid, shellac, cholic acid, benzylic acid, cholanic acid, alkylnaphthalene sulfonic acid, etc. These monocyclic or polycyclic carboxylic acids and monocyclic or polycyclic sulfonic acids have preferably the carbon atom number of 7 to 30.

Futhermore, according to the method of the present invention, acid dyes, organic acid pigments, acidic polymers as well as their salts may be used as the acids.

In the above-mentioned, as the acid dyes are mentioned erythrosine, rose red oxide, tartrazine, Brilliant blue FCF, Fast acid Magenta, rose red oxide K, Orange II, uranine, uranine K, quinoline yellow WS, alizarine cyanine, Green F, Light green SF yellow, Alphazurine FG, resorcin brown, auramine R, Ponseua R, Orange I, naphthol Black, natural coloring matters (e.g. carminic acid, laccainic acid, bixine, curcuminic acid, etc.); as the organic pigments are mentioned those considered generally as pigments, which, having carboxyl, sulfo, nitro group, etc., are similar in structure to acid dyes and are convertible into aluminium lakes, such as naphthol yellow S, Persian orange, Lithol red, lake red C, lake red D, Anthocine B, Brilliant scarlet G, Lithol rubine B, Brilliant carmine 6B, Pigment scarlet 3B, Helio Bordeaux BL, Bordeaux 10B and naphthol green B.

The acids include inorganic acids such as phosphoric acid (metaphosphoric acid, pyrophosphoric acid, orthophosphoric acid, triphosphoric acid and tetraphosphoric acid); isopolyacids such as silicic acid, tripolyphosphoric acid, vitriform phosphoric acid and molybdic acid; heteropolyacids such as silicomolybdic acid, and the like.

Examples of acidic polymers are arginic acid, polyacrylic acid, carboxymethyl cellulose.

Preferable as salts of the above-mentioned acidic substances are salts of these acids with alkali metals or alkaline earth metals, and the sodium salts, in particular, are the most preferable.

Solid substances which are usable in the method according to the present invention as a substance to be treated may be essentially any type of powdery or granular form; preferable are those which are insoluble in water or in organic solvents such as methanol and ethanol. Such a solid material is exemplified by metal powder such as aluminium powder, iron powder and stainless steel powder; inorganic pigments such as alloy powder, iron oxide red, copper oxide, chrome yellow, cobalt blue, Prussian blue and carbon black; organic pigments such as Lithol rubine, Permanent orange and copper phthalocyanine; fluorescent pigments such as yttrium oxide fluorescent substance and oxysulfide fluorescent substance; powder of polymers such as viscose, polyamide resin, polyethylene, and ABS; extenders such as fish-scale leaf, bismuth oxychloride, titanium mica leaf and the like, pearl pigment, baryta powder, precipitated barium sulfate, barium carbonate, calcium carbonate powder, precipitated calcium carbonate, gypsum, asbestos, clay, mica, silica powder, finely powdered silicic acid, diatomaceous earth, talc, basic magnesium carbonate, alumina white, gloss white and satin white; white pigments such as zinc white, white lead, basic lead sulfate, titanium oxide, lead sulfate, lithopone, zinc sulfide and antimony oxide.

The reaction of the method of the present invention is usually carried out in a solvent. The solvent includes water, an organic solvent such as an alkanol (e.g. methanol, ethanol, or the like), or a mixture thereof.

The quantity of each of the starting materials is not specifically limited but, normally, each of the basic polyaluminium salt and acidic substance (or its salt) is employed at a ratio of about 0.01 to 1 part by weight relative to 1 part by weight of the solid substance to be treated. The reaction temperature, also, is not particularly restricted but is properly selected within the range of ambient temperature (i.e. about 5° C. to about 40° C.) to 100° C. p In subjecting the acidic substance as free acid to the reaction, preferably, the reaction is conducted in the presence of a suitable deacidifying agent. Specifically as such deacidifying agent are mentioned hydroxides of alkali metals such as sodium hydroxide and potassium hydroxide; carbonates of alkali metals such as sodium carbonate and potassium carbonate; bicarbonates of alkali metals such as sodium bicarbonate, and the similar bases. The amount of the deacidifying agent to be used may normally be equivalent to H—X by-produced by the reaction, wherein X has the same meaning as defined above.

The reaction usually goes into completion usually within 1 hour.

The reactants and the solid substance may be added in any order. For example, one method comprises adding basic polyaluminium salt to the acidic substance or its salt in the presence of a solid substance in a solvent; and another method comprises adding a solution of acidic substance or its salt to basic polyaluminium salt in the presence of a solid substance. There is no appreciable difference observed between the methods, either of which enables good surface treatment to be effected. Yet, the former is preferable for the hdyrophilic treatment, and the latter for the liophilic treatment.

After the reaction, the reaction product of the basic polyaluminium salt and the acid or its salt, i.e. the above-mentioned polymeric hydroxy-aluminium acid salt, adheres firmly to the surface of the solid substance. And the thus treated solid substance is recovered from the reaction mixture in accordance with conventional means such as filtration.

When a lipophilic acid (usually an organic acid) or its salt is used, the surface of the solid substance is endowed with an improved lipophic property after the reaction, and the thus treated solid substance can be well dispersed in a lipophilic solvent, e.g. oil.

On the other hand, when a hydrophilic acid (for example an inorganic acid) or its salt is used for the reaction, the surface of the solid substance is endowed with improved hydrophilic properties, and the thus treated solid substance can be well dispersed in a hydrophilic solvent, e.g. water.

When a pigment is used as the solid material, there are obtainable the pigments which have very high brightness, remarkably decreased bronze or/and remarkably decreased bleeding in addition to the above-mentioned oil- or water-dispersibility. That is to say, the pigments treated by the present invention is brighter, less in bronze and less in bleeding than the untreated pigment itself. Furthermore, the above-mentioned characteristics are improved in durability due to the strong absorption of the above-mentioned reaction product on the surface of the pigment or the solid substance.

The pigments, which have been treated in this manner, find a wide application in cosmetics, inks, plastics, toners, etc.

The following is an explanation of specific pigments to be used.

Titanium dioxide, for example, is difficult to wet with organic solvents and oils but is easily wetted with water. Such hydrophilic pigments as this take a longer period of time to be dispersed in oils, and further after being dispersed, they settle more rapidly than lipophilic pigments. The titanium oxide pigments also have many drawbacks, such as color phase separation in dispersion systems formed in combination with organic pigments, and cause coarsening or roughening of resin films derived from paints, etc.

There are well known numerous lipophilic-treated products of titanium dioxide, being commercially available in a variety of types, but they are readily subject to a lowering of the treatment effect attributed to desorption by some kinds of organic solvents, physical shear stress, etc.

In contrast to this, the application of the method according to the present invention for the improvement of the lipophilic properties of titanium dioxide eliminates these drawbacks very easily. In this case, as the acidic substance or its salts are selected the compounds having lipophilic groups. Among such compounds containing lipophilic groups are included, for example, aliphatic or aromatic carboxylic acids or sulfonic acids having a carbon atom number of not less than 6, or their alkali salts, such as sodium lauryl sulfate, palmitic acid, myristic acid, ricinoleic acid, isostearic acid, benzoic acid, alkylbenzene sulfonic acid and stearic acid; water-soluble polymers such as polyacrylic acid and its alkali salts, and the like. When such an organic acid as a reactant is reacted with basic polyaluminium salt in the presence of titanium dioxide, bonding of the basic aluminium polymer chain with the organic acid takes place, and the resultant bonded material having e.g. the following structure:

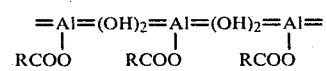

R: an acid residue formed by eliminating hydrogen from a lipophilic acid.
is firmly adsorbed on the surface of titanium dioxide. The strong adsorption helps prevent lowering of the treatment effect due to desorption or elution by solvents, oils, etc. during crushing, mixing, or other processing steps.

Further, carbon black is in general hydrophobic and active on the surface, and, when being dispersed in water, tends to trap air-to-air bubbles and to readily form aggregates, thus making it difficult to produce a uniform dispersion. The method according to the present invention, when applied to eliminate this difficulty, produces carbon black with excellent dispersibility in water by treating the surface of carbon black to render the carbon black hydrophilic. In such a case, as the acidic substance or its salt are selected reactants containing hydrophilic groups exemplified by alginic acid or its alkali salts, water-soluble polymers such as carboxymethyl cellulose; alkali salts of pyrrolidone carboxylic acid; silicic acid, phosphoric acid, chromic acid or their alkali salts (among others, desirable are silicic acid, chromic acid, phosphoric acid or their salts); whereby there results a bonded material having e.g. the following formula:

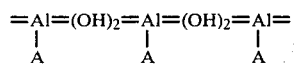

A: acid residue formed by eliminating hydrogen from a hydrophilic acid which is considered to give rise to strong adsorption through active groups on the surface of carbon black, thus realizing the treatment with the durable or stabilized treatment effects and free from desorption by water, organic solvents, etc., and other inconveniences.

The examples and typical and characteristics features of the powdered raw materials obtained therethrough are shown in the following. In the Examples $Al_{12}$ stands for an aqueous solution of the basic polyaluminium chloride having the composition formula of $Al_{12}(OH)_{30}Cl_6$ with Al content of 1.2 mol/l in water; $Al_6$ for an aqueous solution of the basic polyaluminium chloride having the composition formula of $Al_6(OH)_{12}Cl_6$ with Al content of 5.2 mol/l in water, and $Al_1$ denotes the case in which aluminium chloride ($AlCl_3.2H_2O$) is employed.

EXAMPLE 1

| Titanium dioxide | 100 g |
|---|---|
| Sodium stearate | 1 g |
| $Al_{12}$ | 5.44 ml |

In 1 l of water is dispersed 100 g of titanium dioxide and the dispersion is warmed at 80° C. Separately, 1 g of sodium stearate is dissolved in 50 ml of warm water of 80° C., which is mixed with the dispersion solution of titanium dioxide. 5.44 ml of $Al_{12}$ is added gradually to the mixture under stirring, followed by stirring at 60° to 80° C. for 15 minutes and allowing it to cool. Recovering by filtration of the resultant precipitates, followed by washing with water and drying, yields 101.3 g of lipophilic titanium dioxide treated with polymeric hydroxy-aluminium stearate.

EXAMPLE 2

| Titanium dioxide | 100 g |
|---|---|
| Sodium lauryl sulfate | 2 g |
| $Al_6$ | 1.33 ml |

In 1 l of water is dispersed 100 g of titanium dioxide, and the dispersion solution is warmed at 80° C. Separately, 2 g of sodium lauryl sulfate is dissolved in 50 ml of warm water at 80° C., which is mixed with the dispersion solution of titanium dioxide. 1.33 ml of $Al_6$ is added gradually to the mixture under stirring, followed by stirring at 60° to 80° C. for 15 minutes and allowing to cool. Recovering by filtration of the resultant precipitates, followed by washing with water and drying, yield 102.2 g of lipophilic titanium dioxide treated with polymeric hydroxy-aluminium lauryl sulfate.

EXAMPLE 3

| Titanium dioxide | 50 g |
|---|---|
| Sodium stearate | 0.5 g |
| Sodium silicate | 0.5 g |
| $Al_{12}$ | 16.6 ml |

In 500 ml of water is dispersed 50 g of titanium dioxide, and the dispersion solution is warmed at 80° C. Separately, 0.5 g of sodium stearate is dissolved in 50 ml of warm water at 80° C., and 0.5 g of sodium silicate is dissolved in 50 ml of warm water of 80° C. The two solutions are mixed with the dispersion solution of titanium dioxide. 16.6 ml of $Al_{12}$ is added gradually to the mixture under stirring, followed by stirring at 60° to 80° C. for 15 minutes and allowing to cool. Recovering by filtration of the resultant precipitates, followed by washing with water and drying, results in 51.1 g of titanium dioxide treated with the polymeric hydroxy-aluminium polymer to which stearic acid and silicic acid are bonded.

EXAMPLE 4

(1) Non treated titanium dioxide, (2) titanium dioxides having various treatment ratios, prepared in accordance with the method of Example 1, in which kinds of aluminium compounds contained are different, and (3) titanium dioxide treated by the method of Example 3 are subjected to dispersion-stability test. The treatment ratio means the weight percentage of polymeric hydroxy-alumium stearate in terms of stearic acid relative to titanium dioxide.

0.04 g each of the samples is well dispersed in 40 ml of n-butyl acetate, and the mixture is allowed to stand at 50° C. The time when the sedimentation is completed is determined in terms of hour, and the results are summed up in Table 2.

For reference' sake, the salt of stearic acid with $Al_x$ is isolated before the contact with titanium dioxide and then 100 g of titanium dioxide is well admixed with the salt, the amount of the salt in terms of stearic acid relative to titanium dioxide being 1 weight percent. And the mixture is also subjected to the above test, and the results are expressed in the item of "1% mixed".

TABLE 2

| | Treatment ratio (%) | Non-treated | (unit:hour) | | |
|---|---|---|---|---|---|
| | | | $Al_1$ | $Al_6$ | $Al_{12}$ |
| | 0 | 1.0 | — | — | — |
| | 0.5 | — | 2.0 | 2.0 | 3.0 |
| | 1 | — | 1.5 | 6.0 | 24.0 |
| Example 1 | 2 | — | 1.0 | 3.0 | 8.0 |

TABLE 2-continued

| | Treatment ratio (%) | Non-treated | $Al_1$ | $Al_6$ | $Al_{12}$ |
|---|---|---|---|---|---|
| | 5 | — | 3.0 | 4.0 | 48.0 |
| | 10 | — | 2.0 | 10.0 | 48.0 |
| Example 3 | | — | — | — | 24.0 |
| | 1% mixed | — | 5.0 | 2.0 | 1.0 |

EXAMPLE 5

Titanium oxides having various treatment ratios are prepared in accordance with the method of Example 2. Thus obtained titanium dioxides are subjected to the same test to that of Example 4.

The isolated salt of Alx with lauryl sulfate was admixed with titanium dioxide and is also subjected to the test as in Example 4 (cf. 1% mixed).

| | Treatment ratio (%) | $Al_6$ (unit:hour) | $Al_{12}$ |
|---|---|---|---|
| | 1 | 1.5 | 2.5 |
| Example 2 | 2 | 24.0 | 48.0 |
| | 5 | 24.0 | 96.0 |
| | 1% mixed | 4.0 | 1.5 |

EXAMPLE 6

| Carbon black | 50.0 g |
|---|---|
| Sodium tripolyphosphate | 3.7 g |
| $Al_{12}$ | 83.3 ml |

50.0 g of carbon black is well impregnated with 100 g of ethanol. To this is added 500 ml of water, and the carbon black was completely dispersed in the water, followed by the addition of 3.7 g of sodium tripolyphosphate dissolved in 50 ml of water. 83.3 ml of $Al_{12}$ is added gradually to the mixture under stirring, and stirring is continued for 15 minutes. Recovering by filtration of the resultant precipitates, followed by washing with water and drying, results in 59.5 g of glossy carbon black with the excellent water-dispersibility.

EXAMPLE 7

Non-treated carbon black and carbon black preparation treated in accordance with the method of Example 6, in which the treatment ratios and the kinds of basic polyaluminium salt are different as in Example 4, are respectively subjected to the dispersion stability test in the same manner as in Example 4 by employing water in the place of n-butyl acetate. The treatment ratio means accordingly the weight percentage of polymeric hydroxy-aluminium tripolyphosphoric acid in terms of tripolyphosphoric acid relative to carbon black.

TABLE 4

| Treatment ratio (%) | Non-treated | $Al_6$ | $Al_{12}$ |
|---|---|---|---|
| 0 | 0 | — | — |
| 5 | — | >240 | >240 |

EXAMPLE 8

| Iron oxide yellow | 50.0 g |
|---|---|
| Lauric acid | 1.0 g |
| $Al_{12}$ | 8.3 ml |
| Sodium hydroxide | 0.2 g |

In 500 ml of water is dispersed 50 g of iron oxide yellow and the dispersion solution is warmed at 80° C. Separately, 0.2 g of sodium hydroxide and 1.0 g of lauric acid are dissolved in 100 ml of warm water of 80° C. The solution is mixed with the dispersion solution of iron oxide yellow prepared previously. 8.3 ml of $Al_{12}$ is added gradually to the mixture under stirring, and stirring is continued for 15 minutes at 60° to 80° C., then left standing for cooling. Recovering by filtration, followed by washing with water and drying, yields 51.7 g of yellow pigment with excellent lipophilic properties.

EXAMPLE 9

| Iron oxide yellow | 50.0 g |
|---|---|
| Lauric acid | 1.0 g |
| Sodium silicate | 1.0 g |
| $Al_{12}$ | 27.1 ml |
| Sodium hydroxide | 0.2 g |

The method of Example 8 is repeated with exception that in advance of addition of $Al_{12}$, 1.0 g sodium silicate dissolved in 100 ml is added, followed by gradually adding 27.1 ml of $Al_{12}$ in the place of 8.3 ml of $Al_{12}$, resulting in 59.6 g of the iron oxide yellow with much gloss than in Example 8.

EXAMPLE 10

| Titanium dioxide | 40.0 g |
|---|---|
| Tartrazine | 9.0 g |
| Sodium stearate | 9.0 g |
| $Al_6$ | 36.0 ml |

In 500 ml of water is dispersed 40 g of titanium dioxide, and is gradually dissolved 9.0 g of tartrazine, followed by warming at 80° C. Separately, 9.0 g of sodium stearate is dissolved in 100 ml of warm water and added to the previously prepared dispersion solution for thorough mixing. 36.0 ml of $Al_6$ is added gradually to the mixture under stirring, followed by stirring at 60° to 80° C. for 15 minutes and allowing to cool. Recovering by filtration of the resultant precipitates, washing with water and drying, result in 59.6 g of a mixed dispersion material of aluminium lakes (based on the product from tartrazine and basic polyaluminium salt) having following characteristics; freedom from bleeding, excellently uniform coatability, high degrees of the color shade and gloss incomparable to the case of uniform coating with a mixture of lakes and titanium dioxide, and the improved hiding power and yet a fair degree of saturation or chroma retained.

EXAMPLE 11

| Titanium dioxide | 50.0 g |
|---|---|
| Permanent orange | 10.0 g |
| Magnesium laurate | 36.0 g |
| $Al_{12}$ | 167 ml |

At 80° C. in 2.5 l of 90% (W/W) aqueous ethanol is dissolved magnesium laurate. Permanent orange and titanium dioxide are mixed and crushed, and the mixture is dispersed in the solution of magnesium laurate. 167 ml of $Al_{12}$ is diluted with 100 ml of 90% (W/W) aqueous ethanol and added, gradually under stirring, to the above-prepared mixture, which is then stirred for 1 hour and allowed to cool. Recovering by filtration of the resultant precipitates, followed by washing with water and drying, results in 98.9 g of the orange, treated pigment, which does not cause a color phase separation, and shows the excellent oil dispersibility, a high degree of gloss and increased hiding power, when being mixed into oils and fats, resins, etc.

EXAMPLE 12

| Talc | 50.0 g |
|---|---|
| Erythrosine | 22.5 g |
| $(NaPO_3)_n$ | 5.0 g |
| $Al_{12}$ | 166.6 ml |

In 1 l of warm water of 80° C. is completely dissolved 22.5 g of erythrosine, and is well dispersed talc, followed by adding 5.0 g $(NaPO_3)_n$ (a commercial product distributed by Wako Pure Chemical Industries, Ltd. in Japan) dissolved in 100 ml of water. 166.6 ml of $Al_{12}$ is added, gradually under stirring, to the mixture. The resultant mixture is then stirred at 60° to 80° C. for 15 minutes and allowed to cool. Recovering by filtration of the resultant precipitates, followed by washing with water and drying, results in 84.0 g of the red-colored, treated pigment showing the freedom from bleeding, a fair degree of gloss and excellent uniform-coatability.

EXAMPLE 13

| Iron oxide red | 25 g |
|---|---|
| Caprylic acid | 5 g |
| Sodium hydroxide | 1.49 g |
| $Al_6$ | 6.6 ml |

25 g of iron oxide red is dispersed in 500 ml of water. 5 g of caprylic acid and 1.49 g of sodium hydroxide are dissolved in 100 ml of warm water at 80° C., and the solution is added to the dispersion of iron oxide red. 6.6 ml of $Al_6$ is little by little added to the mixture under stirring, followed by further stirring for 30 minutes. The thus formed precipitates are collected by filtration, washed with water and dried to obtain 32.1 g of iron oxide red which is greatly improved in oil dispersibility, highly enhanced in the brightness, increased in the gloss and free from the bleeding.

EXAMPLE 14

Iron oxide red which is used in Example 13 as the starting material and the surface-treated iron oxide red which is obtained in accordance with the method of Example 13 are converted into printing ink according to the examination method of pigments prescribed in Japanese Industrial Standard, and paper strips, respectively, are uniformly coated with each of two kinds of printing ink.

Reflectance measurements at each of the wavelengths on the two specimens by means of the self-recording spectrophotometer reveal that there are marked differences observed between the non-treated iron oxide red and the treated iron oxide red; that is, by calculating the tristimulus values, X, Y and Z, from the measurements by the self-recording spectrophotometer using the Equation of F.M.C. (II), the differences between the non-treated iron oxide and the iron oxide red treated by the method of Example 13 is determined in terms of the color difference, $\Delta E$, resulting in $\Delta E = 19.50$.

What is claimed is:

1. A method of surface treating a powdery or granular solid substance which comprises reacting a basic polyaluminum salt with an acid or its salt in the presence of a powdery or granular solid substance, said basic polyaluminum salt having the composition formula $$Al_{2+n}(OH)_{3n}X_m$$

wherein m is a number produced by dividing 6 by the valence of X, n is a positive integer of not less than 4, and X is an anion.

2. A method as claimed in claim 1, wherein the acid is an inorganic acid and the solid substance is a pigment.

3. A method as claimed in claim 1, wherein the acid is an organic acid and the solid substance is a pigment.

4. A method as claimed, in claim 3, wherein the pigment is titanium dioxide, carbon black, iron oxide yellow, tartrazine or permanent orange.

5. A method as claimed in claim 1, wherein the acid is sulfuric acid, phosphoric acid, chromic acid, silicic acid, tripolyphosphoric acid, vitriform phosphoric acid or molybdic acid.

6. A method as claimed in claim 1, wherein the acid is an aliphatic carboxylic acid of 6 to 22 carbon atoms.

7. A method as claimed in claim 1, wherein the aliphatic carboxylic acid is caproic acid, caprylic acid, capric acid, lauric acid, myristic acid, palmitic acid, stearic acid, behenic acid, ricinolic acid or isostearic acid.

8. A method as claimed in claim 1, wherein the acid is a mono-cyclic or poly-cyclic carboxylic acid of 7 to 30 carbon atoms.

9. A method as claimed in claim 8, wherein the mono-cyclic or poly-cyclic carboxylic acid is a member selected from the group consisting of cinnamic acid, o-benzoylbenzoic acid, cumic acid, diphenylacetic acid, p-ethoxybenzoic acid, naphthalic acid, naphthenic acid, α-naphthoic acid, alkylnaphthalene carboxylic acid, naphthoxyacetic acid, 1-naphthylacetic acid, p-t-butylbenzoic acid, p-n-hexylbenzoic acid, p-n-octylbenzoic acid, p-n-nonylphenoxyacetic acid, p-n-nonylbenzoic acid, glycyrrhetic acid, glycyrrhizic acid, shellac, cholic acid, benzylic acid and cholanic acid.

10. A method as claimed in any of claims 2 to 9, wherein the salt is an alkali metal salt.

11. A method as claimed in claim 10, wherein the salt is sodium salt.

12. A method as claimed in claim 1, wherein the basic polyaluminum salt has a molecular weight of 300 to 50000, and n is an integer in the range of from 4 to 14.

13. A method as claimed in claim 1, wherein X is chlorine, n is 4 and m is 6.

14. A method as claimed in claim 1, wherein X is chlorine, n is 10 and m is 6.

15. A method as claimed in claim 1, wherein X is chlorine, n is 4 or 10, m is 6; the solid substance is titanium dioxide; and the acid or its salt is sodium stearate.

16. A method as claimed in claim 1, wherein X is chlorine, n is 4 or 10, m is 6; the solid substance is titanium dioxide; and the acid or its salt is sodium lauryl sulfate.

17. A method as claimed in claim 1, wherein X is chlorine, n is 4 or 10, m is 6; the solid substance is titanium dioxide; and the acid or its salt is a mixture of sodium stearate and sodium silicate.

18. A method as claimed in claim 1, wherein X is chlorine, n is 4 or 10, m is 6; the solid substance is carbon black; and the acid or its salt is sodium tripolyphosphate.

19. A method as claimed in claim 1, wherein X is chlorine, n is 4 or 10, m is 6; the solid substance is iron oxide yellow; and the acid or its salt is lauric acid.

20. A method as claimed in claim 1, wherein X is chlorine, n is 4 or 10, m is 6; the solid substance is iron oxide yellow; and the acid or its salt is a mixture of sodium silicate and lauric acid.

21. A method as claimed in claim 1, wherein X is chlorine, n is 4 or 10, m is 6; the solid substance is a mixture of titanium dioxide and tartrazine; and the acid or its salt is sodium stearate.

22. A method as claimed in claim 1, wherein X is chlorine, n is 4 or 10, m is 6; the solid substance is a mixture of titanium dioxide and permanent orange; and the acid or its salt is magnesium sulfate.

23. A method as claimed in claim 1, wherein X is chlorine, n is 4 or 10, m is 6; the solid substance is a mixture of talc and erythrosine; and the acid or its salt is $(NaPO_3)_n$.

* * * * *